United States Patent
Turbanti

[15] 3,700,675
[45] Oct. 24, 1972

[54] ESTER OF 2-HYDROXY-CYCLOHEXANE-2-SUBSTITUTED CARBOXYLIC ACIDS

[72] Inventor: Luigi Turbanti, Via Bonaccorso Da Padule, 10, Pisa, Italy

[22] Filed: Sept. 11, 1970

[21] Appl. No.: 71,360

Related U.S. Application Data

[62] Division of Ser. No. 632,563, April 21, 1967, abandoned.

[52] U.S. Cl...260/293.82, 260/247.2 B, 260/293.65, 260/293.73, 260/468 R, 260/473 A, 424/248, 424/267, 424/308
[51] Int. Cl. ..............................C07d 29/24
[58] Field of Search.......260/247.2 B, 268 R, 293.65, 260/293.82, 468 R, 473 R, 473 A

[56] References Cited

OTHER PUBLICATIONS

Morrison et al., " Organic Chemistry, 2nd Edition," Allyn and Bacon, Inc., Boston (1966), p. 467.
Zimmerman et al., J. Am. Chem. Soc. 76, 2285– 2290 (1954).

*Primary Examiner*—Henry R. Jiles
*Assistant Examiner*—G. Thomas Todd
*Attorney*—Steinberg & Blake

[57] ABSTRACT

The invention provides esters of 2-phenyl-2-hydroxy-cyclohexane-carboxylic acid and of 2-cyclohexyl-2 hydroxy-cyclohexane-carboxylic acid, as well as physiologically compatible salts thereof, which esters and salts have a substantial antispastic activity.

7 Claims, No Drawings

ESTER OF 2-7-HYDROXY-CYCLOHEXANE-2-SUBSTITUTED CARBOXYLIC ACIDS

REFERENCE TO RELATED APPLICATIONS

This application is a divisional of my copending application Ser. No. 632,563, filed Apr. 21, 1967, for "2-Hydroxycyclohexanecarboxylic-2-Substituted Acids, Basic Esters Thereof and Salts Showing A Choleretic Antispastic Activity", now abandoned. A separate divisional application Ser. No. 71,539 was filed on Sept. 11, 1970, directed to the choleretic activity of the free acids.

BACKGROUND OF THE INVENTION

This invention generally relates to certain basic esters of 2-phenyl-2-hydroxy-cyclohexane-carboxylic acid and of 2-cyclohexyl-2-hydroxy-cyclohexane-carboxylic acid and physiologically compatible salts thereof, which esters have been found to have a substantial antispastic activity. This is most surprising in view of the fact that the free acids do not have any antispastic activity whatsoever but only have a marked choleretic activity. The esters of the present invention, on the other hand, exhibit a marked antispastic activity without undesired side effects.

SUMMARY OF THE INVENTION

Generally speaking, the present invention provides a series of new compounds having a substantial antispastic activity, these compounds being esters of 2-phenyl-2-hydroxy-cyclohexane-carboxylic acid, and of 2-cyclohexyl-2-hydroxy-cyclohexane-carboxylic acid, as well as salts thereof.

It is thus a primary object of the present invention to provide new esters and salts thereof.

It is another object of the present invention to provide a method of producing these esters as well as the salts thereof.

It is yet a further object of the present invention to provide for antispastic compositions and for methods of treatment in order to achieve an antispastic effect.

Other objects and advantages of the present invention will be apparent from a further reading of the specification and of the appended claims.

With the above and other objects in view, the present invention mainly comprises a compound selected from the group consisting of compounds of the formula:

(I) 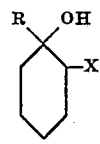

wherein R is selected from the group consisting of phenyl and cyclohexyl, and wherein X is COOR'', wherein R'' is selected from the group consisting of

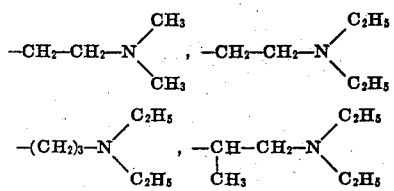

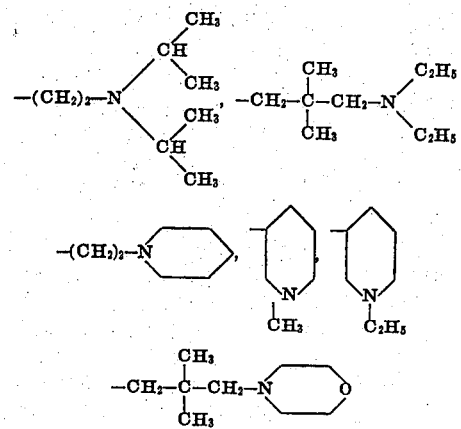

and physiologically compatible salts thereof.

Among the suitable physiologically compatible salts of the above basic esters are those with inorganic and organic acids such as hydrochloric acid, sulfuric acid, citric acid, malonic acid, tartaric acid, etc. The invention also includes quaternary compounds of the above basic esters with alkyl halides such as methyl bromide, ethyl bromide, propyl bromide, butyl bromide, as well as with methyl-para-toluene-sulfate.

The acids from which the esters of the present invention are formed may be produced in several different ways.

The compounds 2-phenyl-2-hydroxyl-cyclohexane-carboxylic acid and 2-cyclohexyl-2-hydroxy-cyclohexane carboxylic acid may be produced by reaction 2-hydroxy-methyl-cyclohexanone with a Grignard reagent in ether solution, isolating the corresponding alcohol 2-hydroxymethyl-cyclohexan-1-ol from the ether reaction solution by vacuum distillation and oxidizing the latter with mixtures such as permanganate-sodium carbonate, chromic anhydride-acetic acid, chromic anhydride-pyridine, dilute nitric acid, or the like, to obtain the desired acid.

The 2-cyclohexyl compound may also be produced by reducing 2-phenyl-2-hydroxy-cyclohexane carboxylic acid in an acetic acid solution in the presence of $PtO_2$ at 70° C. and a pressure of 20 atmospheres.

The basic esters of the present invention may be prepared by reacting the potassium salt of the corresponding acid in alcoholic solution with an alkyl chloride selected from the group consisting of 2-dimethyl-aminoethyl chloride, 2-diethylaminoethyl chloride, 2-diethylamino-1-methyl-ethyl chloride, 3-diethylaminopropyl chloride, 2-di-isopropylaminoethyl chloride, 3-diethyl-amino-2-dimethyl-propyl chloride, 3-chloro-N-methyl-piperidine, 3-chloro-N-ethyl-piperidine, 2(N-piperidino)- ethyl chloride, 3(N-morpholino)-2-dimethyl-propyl chloride and N,N' - (2-chloro-ethyl)-piperazine, and isolating by vacuum distillation the ester formed after separation from the reaction mixture.

Another method of producing the basic esters of the present invention is to transform the corresponding acid into the ester by reacting the potassium salt thereof with the corresponding alkylene dihalide such as 1,2-dibromo-ethane, or 1,3-dibromopropane or 1,2-dibromo-propane, and processing thereof with a secondary amine such as dimethylamine, diethylamine, di-isopropylamine, piperidine or piperazine.

DESCRIPTION OF PREFERRED EMBODIMENTS

The following Examples are given to further illustrate the present invention. The scope of the invention is not, however, meant to be limited to the specific details of these Examples.

EXAMPLE 1

This Example illustrates the production of the free acid 2-phenyl-2-hydroxy-cyclohexane-carboxylic acid.

25 g. of 2-hydroxy-methyl-cyclohexanone, diluted in 20 cc of ether, were dropped into a vessel containing an ether suspension of phenyl-magnesium-bromide (prepared from 19.6 g. of magnesium and 128 g. of bromobenzene in 300 cc. of ether according to usual techniques by stirring and external ice-cooling). The mixture was stirred for some time, then the magnesium compound was decomposed by pouring it carefully into water and ice; the magnesium hydroxide was dissolved in 50 cc. of a saturated solution of ammonium chloride, the ether portion was separated and the aqueous portion extracted with further ether.

Collected and dried ether extracts were evaporated and the residue vacuum distilled yielded 15 g. of a thick oil of b.p. $_{0.1-0.2\ Hg\ mm}$ 127°–135° C.

This product crystallized by dissolving in ether and re-precipitation, with petroleum ether yielded 7 g. of 1-phenyl-2-hydroxy-ethylene-cyclohexan-1-ol. m.p. (Kofler) 81°–83° C.

The thus obtained product was dried and finely powdered, and then suspended in 1.4 l. of an aqueous solution of 14 g. of $KMnO_4$ and 7 g. of $Na_2CO_3$, and the suspension was thoroughly stirred for one day.

After filtering off of the $MnO_2$ thus formed, a small amount of $Na_2SO_3$ was added till the violet coloration disappeared; $MnO_2$ was filtered again and the alkaline solution was acidified with concentrated HCl.

After 1 day standing in a refrigerator, the product was washed with water and filtered, thus yielding 5 g. of 2-phenyl-2-hydroxy-cyclohexane-carboxylic acid, m.p. (Kofler) 143°–145° C.

EXAMPLE 2

This Example illustrates the production of the free acid 2-cyclohexyl-2-hydroxy-cyclohexane-carboxylic acid.

5.6 g. of 2-phenyl-2-hydroxy-cyclohexane-carboxylic acid were dissolved in 75 cc. of glacial acetic acid and reduced in the presence of 0.1 g. of platinum oxide under hydrogen pressure of 22 kg cm² at a temperature of 70°–80° C.

Hydrogen absorption being completed, the solution was filtered and evaporated to one-fifth of its volume and cooled in a refrigerator. The precipitate was filtered and washed with water and then crystallized from ligroin, thus yielding 4 g. of 2-cyclohexyl-2-hydroxy-cyclohexane-carboxylic acid, m.p. (Kofler) 122°–124° C.

The following Examples illustrate the production of the esters of the present invention.

EXAMPLE 3

N-ethyl-3- piperidyl 2-phenyl-2-hydroxy-cyclohexane-carboxylate
In general formula (I)

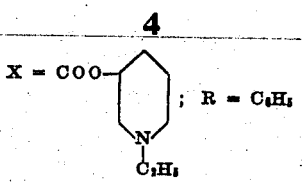

5.5 g. of 2-phenyl-2-hydroxy-cyclohexane-carboxylic acid were dissolved in refluxed 15 cc. of absolute isopropanol and 7 cc. of a methanol solution containing 1.8 g. of potassium methylate and 3.7 g. of 3-chloro-N-ethyl-poperidine were sequentially added in this order to the solution. The solution was refluxed for 3 hours, the inorganic precipitate was filtered after cooling and alcohol evaporated under vacuum.

Residue was extracted with 50 cc. of 0.5N HCl, the hydrochloric solution was twice extracted with ether, alkalinized with NaOH and the oil formed was extracted with ether. The dried and evaporated ether extract left an oleous residue which, vacuum distilled, yielded 3.2 g. of N-ethyl-3-piperidyl 2-phenyl-2-hydroxy-cyclohexane-carboxylate as a colorless oil b.p. $_{0.08\ Hg\ mm}$ 153°–155° C.

EXAMPLE 4

N-ethyl-3-piperidyl 2-phenyl-2-hydroxy-cyclohexanecarboxylate tartrate
In general formula (I)

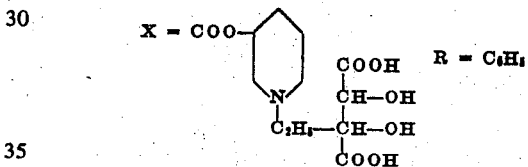

1.65 g. of N-ethyl-piperidyl-2-phenyl-2-hydroxy-cyclohexane-carboxylate dissilved in 50 cc. of ether were reacted with 50 cc. of an ether solution containing 0.75 g. of tartaric acid.

From the resulting solution an oleous product separated at once, which product after repeated washings was in the form of colorless hygroscopic crystals, m.p. 65°–70° C.

EXAMPLE 5

Diethyl-methylammonium ethyl iodide 2-phenyl-2-hydroxy-cyclohexanecarboxylate
In general formula (I)

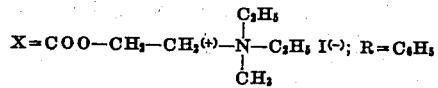

1.5 g. of diethylaminoethyl 2-phenyl-2-hydroxy-cyclohexanecarboxylate and 0.78 g. of methyl iodide were dissolved in 5 cc. of methanol and the solution was heated in a closed vessel at 60 ° C for 7 days. By evaporation of the reaction solution a product was obtained which after washings with ether and crystallizations from isopropanol was in the form of light yellow crystals, m.p. 143°–145° C.

By the general methods previously described the following compounds were obtained.

1. 2-(N-piperidino)-ethyl 2-phenyl-2-hydroxy-cyclohexane-carboxylate

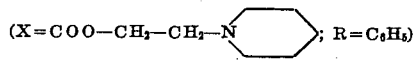

b.p._{0.15} 150° C.

2. 2-diethylamino-isopropyl 2-phenyl-2-hydroxy-cyclohexane-carboxylate

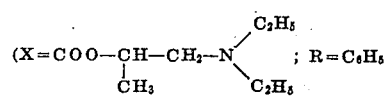

b.p._{0.25} 170° C.

3. 2-di-isopropylamino-ethyl 2-phenyl-2-hydroxy-cyclohexane-carboxylate

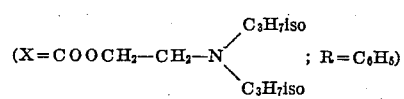

b.p._{0.35} 153° C.

4. 3-diethylamino-2-dimethyl-propyl 2-phenyl-2-hydroxy-cyclohexanecarboxylate

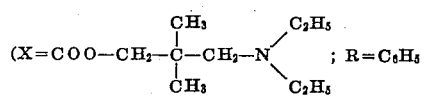

5. 2-dimethylamino-ethyl 2-phenyl-2-hydroxy-cyclohexane-carboxylate

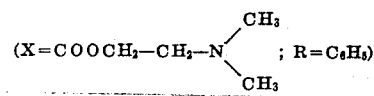

b.p._{0.15} 127°–128° C.

6. N-methyl-3-piperidyl 2-phenyl-2-hydroxy-cyclohexane-carboxylate

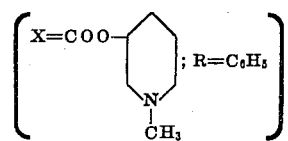

b.p._{0.1} 150° C 7. 3-diethylamino-propyl 2-phenyl-2-hydroxy-cyclohexane-carboxylate

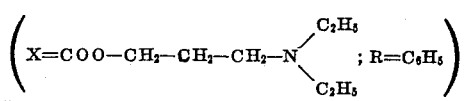

b.p._{0.25} = 174°–175° C.

8. 2-diethylamino-ethyl 2-cyclohexyl-2-hydroxy-cyclohexane-carboxylate

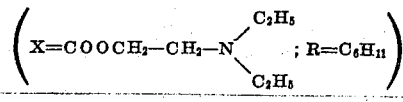

b.p._{0.8} 165° C.

9. 2-diethylamino-1-methyl-ethyl 2-cyclohexyl-2-hydroxy-cyclohenane-carboxylate

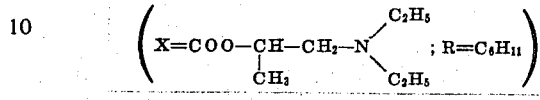

b.p._{0.1} 148°–150° C.

10. 3-diethylamino-2-dimethyl-propyl 2-cyclohexyl-2-hydroxy-cyclohexane-carboxylate

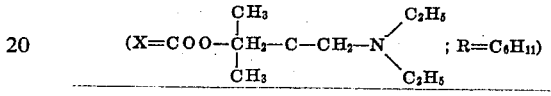

m.p. 36°–39° C 11. 2-di-isopropylamino-ethyl 2-cyclohexyl-2-hydroxy-cyclohexane-carboxylate

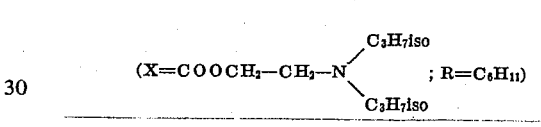

b.p._{0.1–0.15} 152° C.

12. 2,2-dimethyl-3-(4'-morpholino)-propyl 2-phenyl-2-hydroxy-cyclohexane-carboxylate
R=C_6H_5

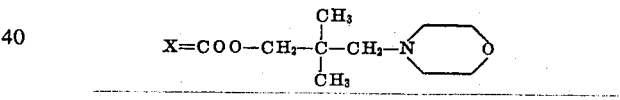

m.p. 76°–78° C, colorless crystals.

13. 1-ethyl-3-piperidyl 2-cyclohexyl-2-hydroxy-cyclohexane-carboxylate
R=C_6H_{11}

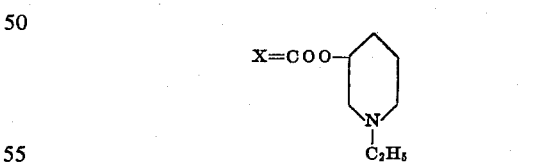

b.p._{0.2} 198°–200° C: light yellow oil.

14. 3-diethylamino-propyl 2-cyclohexyl-2-hydroxy-cyclohexane-carboxylate
R=C_6H_{11}

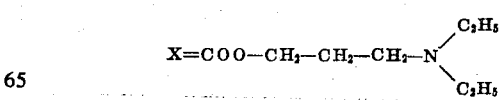

b.p._{0.3} 183° C, yellow oil.

15. 2-diethylaminoethyl 2-cyclohexyl-2-hydroxy-cyclohexane-carboxylate
R = C₆H₁₁

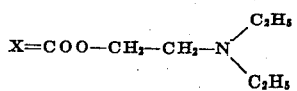

b.p.₀.₄ 169° C; colorless oil.

16. 2,2-dimethyl-3-(4'-morpholino)-propyl 2-cyclohexyl-2-hydroxy-cyclohexane-carboxylate
R = C₆H₁₁

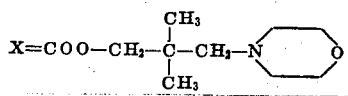

b.p.₀.₀₅ 169° C; colorless oil.

17. 1-methyl-3-piperidyl 2-cyclohexyl-2-hydroxy-cyclohexane-carboxylate
R = C₆H₁₁

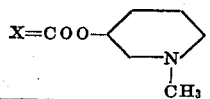

b.p.₁.₄ 185°–186° C; yellow oil.

18. 2-(1-piperidino)-ethyl 2-cyclohexyl-2-hydroxy-cyclohexane- carboxylate
R = C₆H₁₁

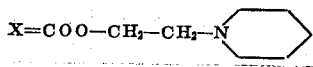

b.p.₀.₁ 166°–167° C; yellowish oil.

19. 2-diethylaminoethyl-2-phenyl-2-hydroxy-cyclohexane-carboxylate

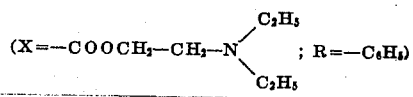

oil; b.p.₀.₁₋₀.₅ 134°–135° C.

The salification products of the above amino esters with inorganic acids such as hydrochloric acid and sulfuric acid or organic acids such as tartaric acid, dibenzoyltartaric acid, succinic acid, citric acid, etc., and the quaternary products with alkyl halides such as methyl bromide, methyl iodide, ethyl bromide, ethyl iodide, butyl bromide and methyl-p-toluene sulfonate are generally in the form of oils or uncrystallizable amorphous products, and only in some cases are they in the form of crystalline products. The following are Examples of these products:

1. Diethylaminoethyl 2-phenyl-2-hydroxy-cyclohexane-carboxylate hydrochloride; colorless thick oil with analytic data agreeing with theoretical data.
2. 2-dimethyl-3-triethylammonium-propyl 2-phenyl-2-hydroxy-cyclohexane-carboxylate iodide; low melting, amorphous, resinous solid product.
3. 2-dimethyl-3-diethyl-methylammonium-propyl 2-phenyl-2-hydroxy-cyclohexane-carboxylate iodide; low melting, amorphous yellow powder.
4. 2-dimethyl-3-diethyl-methylammonium-propyl p-toluene-sulfonate 2-cyclohexyl-2-hydroxy-cyclohexane-carboxylate; colorless crystals, m.p. 140°–144° C.
5. 2-di-isopropyl-methylammonium-ethyl-p-toluenesulfonate 2-cyclohexyl-2-hydroxy-cyclohexane-carboxylate; yellow thick oil.

The antispastic activity of the esters and salts was determined on segments of various isolated organs and it could be observed that the products of the invention inhibit or prevent contraction caused by various spasmogen agents both of hormonal and humoral nature, as well as of a different nature; for some of the tested compounds such inhibitory or preventive activity is already apparent at a concentration of $1\times10^{-5}$ and $1\times10^{-7}$.

The antispastic activity of the compounds according to the invention is better shown in Table 3, wherein, in terms of concentration, the $ED_{50}$ inhibiting the spasm of isolated organs are given (guinea pig's terminal ileus, rat's ascending colon, rat's jajunam, she-rat's uterus) produced by some spasmogen agents, such as histamine (Hist), 5-hydroxy-tryptamine (5HI), acetyl choline, and $BaCl_2$. In the table, along with some products according to the invention, there are also given some commercially available antispastics, and the respective values of $ED_{50}$ prove that the new compounds may be advantageously compared with the latter.

TABLE 3

| Products used | Hist. 0.1 g/ml | Spasmogens 5HT 1 g/ml | Acetyl choline 0.15 g/ml | Bacl 250 g/ml |
|---|---|---|---|---|
| LG.30140 | 4. 10⁻⁶ | 1.5.10⁻⁵ | 2 .10⁻⁷ | 5. 10⁻⁶ |
| LG.30141 | 5 .10⁻⁶ | 6 .10⁻⁵ | 3 .10⁻⁸ | 7.5 .10⁻⁶ |
| LG.30144 | 1.5. 10⁻⁵ | 2.5.10⁻⁵ | 2.5 .10⁻⁷ | 2.5 .10⁻⁶ |
| LG.30127 | 5 .10⁻⁶ | 6 .10⁻⁵ | 1 .10⁻⁷ | 1.5 .10⁻⁵ |
| LG.30128 | 1. 10⁻⁵ | 6 .10⁻⁵ | 1 .10⁻⁷ | 5 .10⁻⁶ |
| Papaverine | 7.5.10⁻⁶ | 1 .10⁻⁵ | 1 .10⁻⁶ | 2.5 .10⁻⁶ |
| Buscopan | 1 .10⁻⁴ | 1 .10⁻³ | 2 .10⁻⁷ | 1 .10⁻³ |
| Spasmamide | 2.5.10⁻⁵ | 2.5 .10⁻⁵ | 5 .10⁻⁶ | 2.5 .10⁻⁶ |

LG.30140 = N-ethyl-3-piperidyl 2-phenyl-2-hydroxy-cyclohexane-carboxylate
LG.30141 = diethylaminoethyl 2-phenyl-2-hydroxy-cyclohexane-carboxylate
LG.30144 = 2-diethylaminoethyl 2-cyclohexyl-2-hydroxy-cyclohexane-carboxylate
LG.30127 = 2-(N-piperidino)-ethyl 2-phenyl-2-hydroxy-cyclohexane-carboxylate
LG. 30128 = 3-diethylamino-propyl 2-phenyl-2-hydroxy-cyclohexane-carboxylate
Buscopan = N-butyl bromide of joscine
Spasmamide = diethylaminoethylamide of the monoethyl ester of phenylethyl-malonic acid The products according to the invention are much less toxic than papaverine and the $LD_{50}$ thereof by endoperitoneal route in a 15 g. mouse (Swiss stock) is about 220 mg-kg (Papaverine $LD_{50} = 105$ mg-kg).

Drugs according to the invention do not show hypotensive effects and are particularly suitable for spasms of biliary organs and the alimentary canal both because they are removed by the biliary tract and for their clearly anti-acetyl choline action, which action is of the same degree as that of stropine.

For these reasons the compounds of the present invention are therapeutic agents useful for treating many unhealthy conditions of biliary organs and liver, and in the therapy of spastic conditions of digestive organs, biliary organs, urinary organs and genital system.

The following illustrates the production of antispastic compositions utilizing the compounds of the present invention as active ingredient.

Tablets weighing 0.1 g. each are prepared by normal tabletting procedures so that each tablet contains.

| | |
|---|---|
| 2-diethylaminoethyl 2-phenyl-2-hydroxy-cyclohexane-carboxylate | 10 mg |
| Starch | 40 mg |
| Lactose | 30 mg |
| Talc | 15 mg |
| Magnesium stearate | 5 mg |

The normal dosage of the above tablets is 2 – 4 tablets per day.

The above tablets were utilized in clinical testing. The composition was tested on 42 subjects of both sexes, aged between 25 and 60, divided into the following nosological groups according to disease:

| | Number of patients |
|---|---|
| Spastic diseases of gastroenteric canal | 16 |
| Spasms of biliary organs | 19 |
| Spastic diseases of urological nature | 4 |
| Painful spastic manifestations of a gynecological relevancy | 3 |

As diagnostic principles the subjective reports given by the subjects being examined and the objective reports provided by the ordinary research of physical and functional semeiology were used, and conformed to the following principle for estimating the therapeutic drug activity:

Remission of painful symptomatology after a period of time varying from 15 to 30 minutes after supply, and improvement or resolution of instrumental or laboratory reports.

Judgement +++

Apparent attenuation, but not complete disappearance of painful symptomatology.

Judgement ++

Pain persistance

Judgement O

The patients were supplied with 2–4 pills a day taken not at meal time or according to requirements, for a period of time from 7 to 10 days, the following results being obtained:

| Patients suffering from: | Results +++ | ++ | 0 | Total number of patients |
|---|---|---|---|---|
| Spastic diseases of gastroenteric canal | 15 | 1 | 0 | 16 |
| Spasms of biliary organs | 15 | 3 | 1 | 19 |
| Spastic diseases of urological nature | 2 | 0 | 2 | 4 |
| Painful spastic manifestations of gynecological nature | 1 | 1 | 1 | 3 |

It may be noticed from the results that maximum drug effectiveness was attained in spastic diseases of gastroenteric canal and biliary organs, where disappearance of troubles was noticed from the very first days of drug supply, while revealing a substantial improvement of digestive and hepatobiliary functionality. Inconstant results were achieved for uroligical and gynecological diseases. Perfect local and general tolerability in absence of secondary or atropino-wise effects was observed.

While the invention has been illustrated in particular with respect to certain specific esters, the production thereof, and the use thereof for their antispastic activity, it is apparent that variations and modifications of the invention can be made.

What is claimed is:

1. A compound selected from the group consisting of compounds of the formula:

(I) 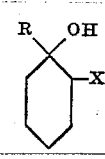

wherein R is selected from the group consisting of phenyl and cyclohexyl, and wherein X is COOR'', wherein R'' is selected from the group consisting of

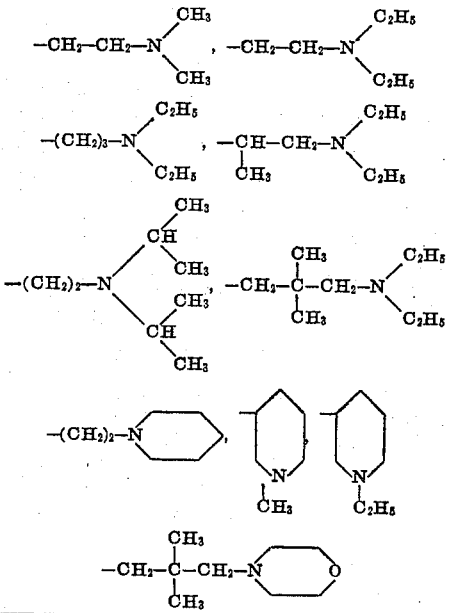

and physiologically compatible salts thereof.

2. The compound of claim 1 wherein said compound is N-ethyl-3-piperidyl 2-phenyl-2-hydroxy-cyclohexane-carboxylate.

3. The compound of claim 1 wherein said compound is 2-diethylaminoethyl 2-phenyl-2-hydroxy-cyclohexane-carboxylate.

4. The compound of claim 1 wherein said compound is 2-diethylaminoethyl 2-cyclohexyl-2-hydroxy-cyclohexane-carboxylate.

5. The compound of claim 1 wherein said compound is 2-(N-piperidino)-ethyl 2-phenyl-2-hydroxy-cyclohexane-carboxylate.

6. The compound of claim 1 wherein said compound is 3-diethylamino-propyl 2-phenyl-2-hydroxy-cyclohexane-carboxylate.

7. The compound of claim 1 wherein said compound is 2-diethylamino-1-1-methyl-ethyl 2-cyclohexyl-2-hydroxy-cyclohexane-carboxylate.

* * * * *

UNITED STATES PATENT OFFICE
CERTIFICATE OF CORRECTION

Patent No. 3,700,675　　　　　　　　　Dated  October 24, 1972

Inventor(s)　Luigi Turbanti

It is certified that error appears in the above-identified patent and that said Letters Patent are hereby corrected as shown below:

[30]　　Foreign Application Priority Data
           April 29, 1966　　Italy..... 17,335

Signed and sealed this 8th day of May 1973.

(SEAL)
Attest:

EDWARD M.FLETCHER,JR.　　　　　　　ROBERT GOTTSCHALK
Attesting Officer　　　　　　　　　　Commissioner of Patents